March 17, 1970   H. GUSSENBAUER ET AL   3,500,701
DEVICE FOR SETTING THE ACCELERATOR PEDAL OF A MOTOR VEHICLE
Filed June 13, 1968   3 Sheets-Sheet 1

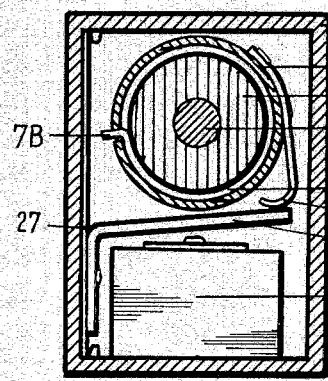 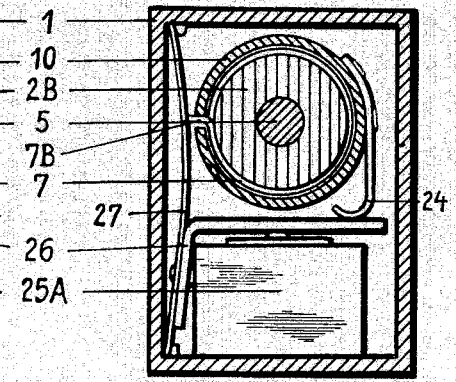
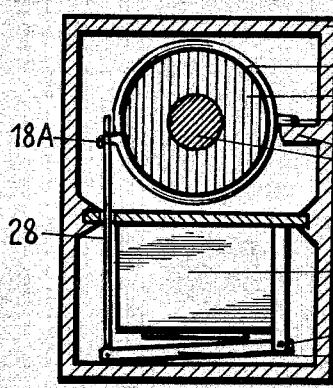 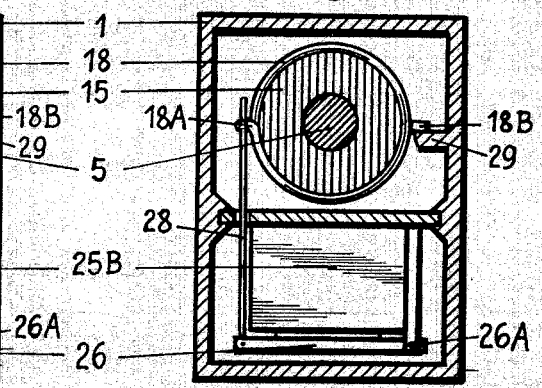

INVENTORS
HEINRICH GUSSENBAUER
KURT GUSSENBAUER
BY
*Nolte & Nolte*
ATTORNEYS

March 17, 1970 H. GUSSENBAUER ET AL 3,500,701
DEVICE FOR SETTING THE ACCELERATOR PEDAL OF A MOTOR VEHICLE
Filed June 13, 1968 3 Sheets-Sheet 3

INVENTORS
HEINRICH GUSSENBAUER
KURT GUSSENBAUER

BY *Nolte & Nolte*
ATTORNEYS

3,500,701
DEVICE FOR SETTING THE ACCELERATOR PEDAL OF A MOTOR VEHICLE

Heinrich Gussenbauer, 2 Schleifmuhlgasse, 1040 Vienna 4, Austria, and Kurt Gussenbauer, Terramaregasse 3, Vienna 23, Austria
Filed June 13, 1968, Ser. No. 736,666
Int. Cl. G05g 1/14; B65h 59/10; F16d 51/00
U.S. Cl. 74—513                                13 Claims

ABSTRACT OF THE DISCLOSURE

A device capable of maintaining an accelerator pedal of a vehicle releasably at a selected position. The device includes a rotary shaft the angular position of which corresponds to that of the accelerator pedal. A stationary drum surrounds the rotary shaft and supports it for rotary movement while a rotary drum is fixed to the shaft for rotation therewith. A spring is coiled about both drums and normally grips them at their exterior surfaces so as to maintain the rotary drum and shaft at a given position with respect to the stationary drum. A loose sleeve surrounds the rotary drum and has a diameter slightly greater than that of the spring. This spring has a free end connected to the loose sleeve for rotary movement therewith, and the loose sleeve has an operating projection extending therefrom. A movable means has a normal unlocking position of rest where it engages the operating projection to maintain the loose sleeve at an angular position where it lifts the spring from the rotary drum. A moving means coacts with this movable means to shift it from its normal unlocking position of rest to an operating position releasing the operating projection so that the spring will then grip the rotary drum and maintain it together with the shaft at a selected position.

BACKGROUND OF THE INVENTION

The present invention relates to a setting device for the accelerator pedal of motor vehicles according to German Patent No. 1,177,014 wherein two drums, mounted on a rotatable shaft, are provided, which can be rigidly connected with each other by a pin, one of said drums being encircled by a coiled spring, whose free spring end can be lifted off in a sense opposite to that of the spring windings by means of a slide or lever. The spring coils, however, do not lift themselves off uniformly from the drum, which involves the disadvantage, that the coiled spring has to be unwound rather strongly in order to clear the drum completely. In addition to causing a large lost motion this may lead to warping of individual windings of the coil. Moreover this device is difficult to mount in view of the long Bowden cables leading to the pedals of the motor vehicle, particularly in rear engined vehicles.

SUMMARY OF THE INVENTION

These disadvantages are obviated by the present invention, which allows also an electrically controlled release of the locking thereof (when actuating the brake-and/or clutch pedal), which simplifies the mounting.

Thus, it is an object of the present invention to provide a construction which will very reliably control the unlocking of the accelerator and the locking thereof at a selected position.

Furthermore, it is an object of the present invention to provide a construction of this type which will respond to actuation of an operating pedal of the vehicle, such as the brake/pedal or clutch pedal thereof.

In addition, it is an object of the present invention to provide for the locking of the accelerator at a selected position anyone of a number of actuating structures which may be mechanical or electrical.

The device according to the present invention comprises primarily two drums mounted on a shaft connected with the accelerator linkage, one of which drums is connected with the said shaft for rotation therewith, while the other drum serves as a slide bearing for said shaft and is fixed to the casing of the device. A coiled spring encircles both said drums. That end of the spring, which in the sense of rotation performed by said shaft when depressing the accelerator pedal, points in the direction of this sense of rotation, is forced by a sleeve pushed over it against the drum anchored to the casing in a slip-free manner, while over the windings of the spring encircling the other drum a sleeve is pushed loosely, whose inner diameter exceeds the outer diameter of the spring windings slightly, by about 0.1 mm., when these windings rest snugly on the said drum. This sleeve, in whose wall the end to be lifted off of the spring is anchored, has on its outside a radially projecting pin, which is capable of being pushed away in the direction opposite to the sense of winding of the coiled spring by an inclined face of a slide or by a lever. When turning this sleeve the windings of the coiled spring are uniformly unwound until they contact the inner wall surface of the sleeve, whereby the same is centered over the drum and the locking of the device is eliminated.

The turning of the said sleeve may be effected not only by Bowden cables leading from the said slide or lever to an actuating knob and to the brake-and/or clutch-pedal, respectively, but could be effected alternatively in the following manner: both sleeves have on their ends facing one another saw-tooth shaped serrations, which in the rest position are slightly offset from each other, and whose oblique edges effect the turning of the loose sleeve in a sense opposite to that of the windings of the coiled spring, when this loose sleeve is pressed towards the fixed sleeve. This action is carried out by three balls, which are housed in three bores angularly offset from each other by 120° and extending parallel to the axis of the device in a disc, which is rigidly connected with the said shaft, and bear against the end face of a third drum mounted rotatably on the said shaft but restrained in the axial direction. In the end face of this drum (which acts as a "memory"), part spherical or conical recesses are provided of dimensions adapted to the size of the balls in such a manner that the depth of penetration of the balls into these recesses corresponds to the advance of the loose sleeve required for lifting off the coiled spring from the drum, and is somewhat smaller than the radius of any of the balls. The diameter of each of the balls has to exceed the thickness of the said disc by at least the length of the advance path required.

By that sleeve, which is under spring bias and is loosely pushed over the coiled spring, these balls are forced into the recesses of the memory drum, whereby its carrying around is effected, when the shaft is turned. However, as soon as this drum is arrested in any position desired by means of brake jaws or by tensioning the ends of the windings of another coiled spring encircling the said drum with frictional contact, this has the result, that upon any further turning of the shaft the said balls guided in said bores of said disc are forced out of their recesses in the memory drum, in which they were seated, and are forced against the loose sleeve, whereby the same is forced against the oblique edges of the serrations on the end face of the fixed sleeve and is thus turned in a sense opposite to that of the windings of the first mentioned coiled spring, whereby the same is lifted off the drum. Only in that rotational position of the shaft, which corresponds to that of the fixed drum, the balls sink into their recesses, so that the lifting off of the first mentioned coiled spring is terminated and the drum is locked. In all other rotational positions the said drum is unlocked.

The arresting of the memory drum may be effected by advancing a slide against spring bias, which slide is connected by a Bowden cable with an arrestable actuating knob. When using a second coiled spring, which is loosely pushed over the memory drum as a detent element, the ends of the windings thereof are either turned relatively to one another or tensioned by a lever. At the same time the radial projection of the sleeve loosely pushed over the first mentioned coiled spring is released by the inclined face of the said sleeve.

In order to release the locking of the shaft when actuating the brake-and/or clutch pedal, these pedals are connected with the said slide each by a Bowden cable, said slide engaging with the radially projecting pin of the loose sleeve.

The tensioning of the second mentioned coiled spring, which encircles the memory drum, may alternatively be effected by the armature of a solenoid acting as a lever as well as by turning a loose ring by means of an electromagnet, the current supply of which is controlled by a contact switch connected with the brake and/or clutch pedal, so that when actuating these pedals the current supply to the electromagnet is interrupted. The armature of the solenoid then drops off and is then pressed by spring bias against the radial projection of the loose sleeve. The pull of the solenoid has in any case to exceed the force of the biasing spring.

By means of a further interrupter-switch mounted on the accelerator pedal and having a sliding contact, through which the current supply is conducted to the last mentioned solenoid, temporary abolishing of the arresting may be effected without actuating the brake pedal, so that partial throttling and operation of the brake of the throttled engine is made possible. Conveniently this switch mounted on the accelerator pedal is shaped flat and is so constructed, that upon a slight displacement of the interrupter contact (by a few mm.) in one direction the current is established, and upon a like displacement in the other direction is interrupted again.

The interrupting switch must be protected against soil and damage. The covering plate provided for this purpose covers the accelerator pedal, at the plate thereof which is engaged by the foot of the operator, at its forward, upper, and lateral portions, and this covering plate is operatively connected with the switch in order to actuate the latter. This actuation is brought about by mounting the covering plate on the plate of the accelerator pedal so as to have a relativley small extent of play with respect thereto in accordance with a construction where the covering plate is shifted, turned, or tilted with respect to the plate of the accelerator. In one end position of the covering plate the circuit is closed and in the other it is open.

The oblique serrations of the two sleeves may be dispensed with, when the current supply to the solenoid is made via a contact switch, which is so arranged, that the collar of the loose sleeve bears on the contact arm of the switch, and that thus the current supply is interrupted, when the balls are forced out of the recesses in which they are seated. However, the switch may alternatively be connected with the memory drum and may by one contact arm cooperate in such a manner with the other drum, which is connected with the shaft for when the rotational positions of the two drums correspond to each other. In this case the loose sleeve need not be axially slidable, and the balls arranged between the two drums may be mounted resiliently in blind bores of one of the drums.

BRIEF DESCRIPTION OF DRAWINGS

An embodiment of the invention is shown by way of example in the accompanying drawing, in which:

FIG. 3 is a cross-section on the line A–B of FIG. 1, when the coiled spring firmly contacts the drum, while FIG. 4 is a cross-section corresponding to FIG. 3, with the coiled spring disengaged from the drum;

FIG. 6 is a transverse schematic sectional illustration of an embodiment which uses electromagnetic actuation;

FIG. 7 shows the structure of FIG. 6 in the position where the electromagnet is energized;

FIG. 8 is a transverse section schematically illustrating an electromagnetic structure associated with a memory drum and shown in deenergized condition;

FIG. 9 shows the structure of FIG. 8 with the electromagnet energized;

DESCRIPTION OF PREFERRED EMBODIMENTS

Figures 3, 4:
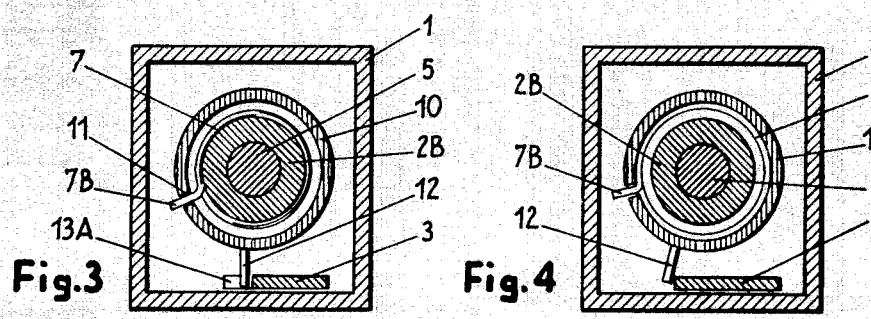

The device is housed in a casing 1, wherein a drum 2A is attached, in whose bore a shaft 5 is journalled rotatably. On this shaft a drum 2B is mounted so as to take part in its rotation, and both drums 2A and 2B are surrounded by a coiled spring 7. In the region of the drum 2A a sleeve 9 is mounted co-axially surrounding said drum and forcing the windings of the coiled spring on said drum. A second sleeve 10 loosely surrounds the windings of the coiled spring in the region of the drum 2B with slight clearance. The free end 7B of the coiled spring is passed through an axially directed slot 11 in the wall of the sleeve 10, so that upon turning the ring 10 in a clockwise direction (FIG. 3) the spring is pressed on the inner wall surface of the said sleeve and is thus lifted off the circumference of the drum 2B. The two sleeves 9 and 10 have opposite saw-tooth shaped serrations 9A and 10A, respectively, whose oblique edges permanently engage one another partly. When the loose sleeve 10, against the bias of a compression spring 14 engaging its collar 10B, is forced by balls 8 towards the fixed sleeve 9, the oblique edges effect rotation of the loose sleeve in the clockwise sense (FIG. 3) opposite of that of winding of the coiled spring 7.

Figure 1:
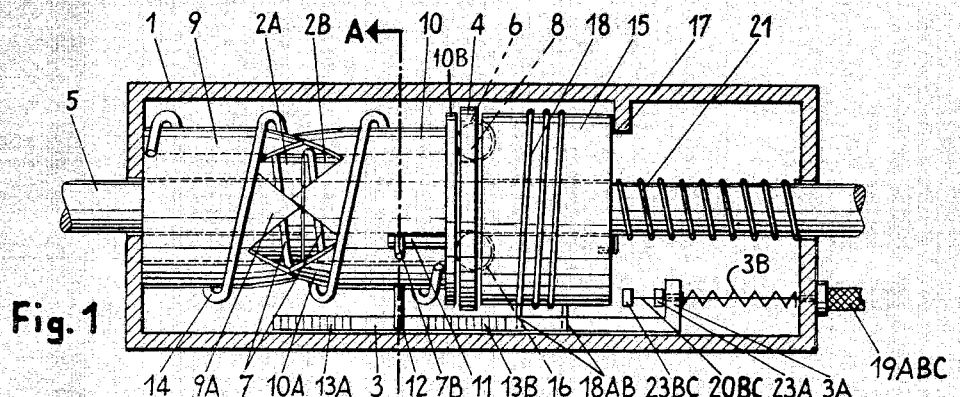
FIG. 1 is a diagrammatic longitudinal section of the device in the engaged condition.
Figure 5:
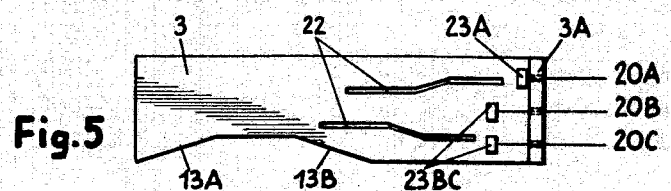
FIG. 5 is a plan view of the control slide.

The balls 8 are housed axially movable in bores 6 of a disc 4, which is rigidly connected with the drum 2B, and in their rest position lie in recesses 16 of a further drum 15, which is mounted on the shaft 5 rotatably, but is restrained against axial displacement by an extension 17 of the casing 1 projecting into the interior thereof. The drum 15 is loosely surrounded by a coiled spring 18, whose coils can be forced against this drum by the ends of said coiled spring engaging in guide slots 22 (FIG. 5) of an axially movable slide 3. The middle portions of these guide slots converge, and when the slide 3 is pulled by actuation of a control knob (not shown) by means of cables 20B or 20C (FIG. 5) and end piece 23B or 23C of Bowden cables 19B or 19C to the right in the drawings, the ends of the spring 18 are drawn towards one another in the circumferential direction, whereby this spring is tightened on the drum 15. The slide 3 forms a movable means coacting with the operating pin 12 of the loose sleeve 10 for controlling the position of the latter. In the rest or normal position of the movable means formed by the slide 3 the spring 3B coacts with the flange 3A of the slide 3 to maintain the latter at a position where the inclined edge face 13B coacts with the operating projection 12 to turn the loose sleeve 10 to a position where it will lift the gripping spring 7 from the rotary drum 2B, thus unlocking the rotary drum and the shaft 5. A moving means is provided for moving the movable means formed by the slide 3 from this unlocking rest position determined by the spring 3B to an operating position, and this moving means may take the form of a Bowden cable 19A accessible to the operator and having its cable 20A extending through an opening of the flange 3A, in the same way that the cables 20B and 20C extend through openings of this flange. Upon actuation of the Bowden cable 19A the end plate 23A will engage the flange 3A to move the movable means 3 to its operating position where the edge face between the inclined faces 13A and 13B is in alignment with the operating pin 12, as indicated in FIG. 1, and in this position the pin 12 is released so that the spring 7 is released to grip the rotary drum 2B and place the loose sleeve 10 at a predetermined angular position with respect thereto, thus locking the rotary drum 2B and the shaft 5 at a selected angular position corresponding to a selected position of the accelerator pedal.

The slide 3 has two inclined edge faces 13A and 13B. By the inclined face 13B, a pin 12 radially projecting from the sleeve 10 is turned from the position shown in FIG. 3 into the position shown in FIG. 4, when the device is disengaged, and thus the sleeve 10 is turned in the sense opposite to that of the windings of the coiled spring 7. However, when the device is engaged, the slide 3 is pulled so far to the right in the drawing that the pin 12 is in the region of the slide 3 between the inclined faces 13A and 13B. By the torque of the coiled spring 7, which then snugly encircles the drum 2B, the sleeve 10 is then turned into the normal position. When actuating an operating pedal such as the brake or the clutch pedal of the car, the slide 3 is pulled further to the right in the drawing by the cables 20B and 20C belonging to the Bowden cables 19B and 19C, respectively, so that the pin 12 then runs up against the inclined face 13A of the slide 3 and is again deflected by the same into the position shown in FIG. 4. The result is the temporary lifting off of the coiled spring 7 from the drum 2B, and the release of the locking of the rotatable shaft 5, in a second unlocking position of slide 3.

Upon any turning of the shaft 5 and of the disc 4 fixedly connected with it, the drum 15 is carried around by the balls 8 being forced into its recesses 16, as long as it is not restrained by the coiled spring 18. A coiled spring 21 effects the retwining of the drum 15 into its initial rotational position, when the device is switched off.

Instead of the manually operable Bowden cable 19A to form a moving means for the movable means 3, it is possible to provide a solenoid which when energized will shift the movable means 3 in opposition to the spring 3B to the location where the operating projection 12 is situated between the inclined edge faces 13A and 13B. This solenoid can have its circuit controlled in any suitable way, such as by a manually operable switch accessible at the dash of the vehicle, or the solenoid may be actuated by the plate which is mounted on the accelerator pedal for a limited degree of movement with respect thereto. In addition it is possible to provide the brake or clutch pedal of the vehicle with a switch actuating structure which when actuated will deenerigize the solenoid so that the spring 3B will return the movable means 3 to its unlocking position of rest.

Figure 2:
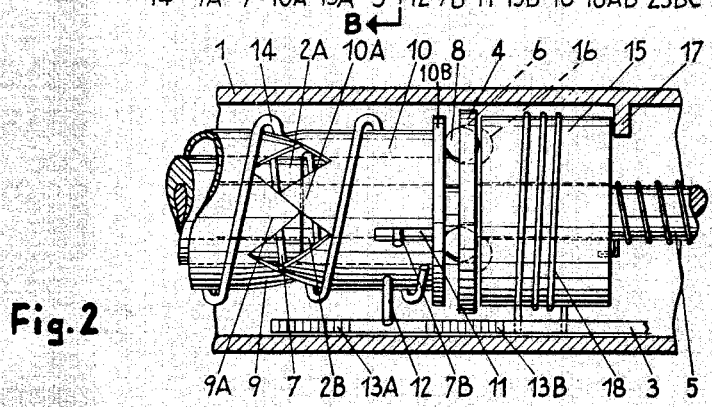
FIG. 2 is a part-section corresponding to FIG. 1 in the condition in which the accelerator pedal further depressed.

It is also possible to provide a construction where the sleeves have no overlapping teeth at their overlapping ends and instead the current is supplied to the solenoid by way of a limit or end switch actuated to interrupt the circuit when the loose sleeve 10 engages with a collar at its right end, as viewed in FIGS. 1 and 2, such an end or limit switch or when the rotary drum 15 has an angular position which actuates such a switch. In this latter type of construction the loose sleeve 10 is not axially movable and the balls which are in the recesses of the drum 15 are resiliently mounted in blind bores of the opposite drum.

In the case where the switch is actuated by a covering plate movable with respect to the plate of the accelerator pedal, this pedal carries a pivot pin on which the swingable or tiltable plate is mounted for a given degree of free movement with respect to the plate of the accelerator pedal.

Figure 10:
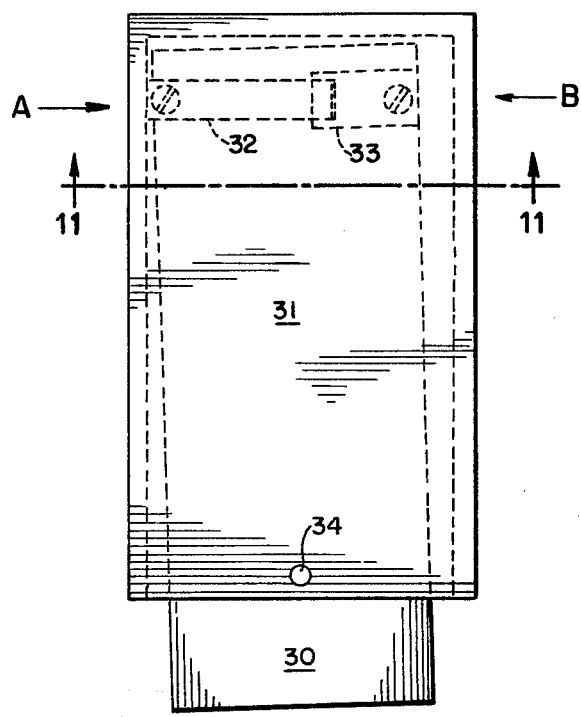
FIG. 10 is a plan view showing diagrammatically the accelerator pedal with the cover plate disposed thereon.
Figure 11:
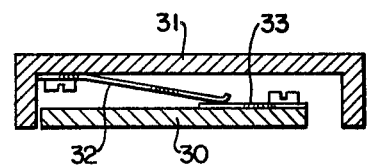
FIG. 11 is a cross-section along line A–B of FIG. 10 with contacts in a closed position.
Figure 12:
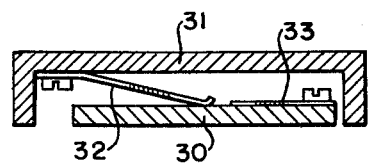
FIG. 12 is a cross-section corresponding to FIG. 11, with contacts in an open position.

It is also possible to use a cover plate which covers the pedal plate of the accelerator pedal at its front, at its top, and on both sides, and this cover plate is slidable with relatively little play with respect to the pedal plate so as to be movable either laterally, in elevation, or pivotally about a pin on the accelerator pedal. The electrical circuit is closed by a switch at one end position of the cover plate and is interrupted at the other end position thereof. This is best seen in FIGS. 10–12 which, later on, will be described in more details.

Referring now to FIGS. 6 and 7, the loose sleeve 10 which surrounds the spring 7 on the drum 2B has an operating projection 24 riveted thereto and terminating in a curved free end which engages the armature 26 of a solenoid which includes the electromagnet 25A. The armature 26 is carried by an elongated leaf spring 27 which biases the armature 26 to the position shown in FIG. 6 where the spring 7 does not grip the drum 2B. Upon actuation of a switch, as when operating the brake of the vehicle, after braking of the vehicle has ceased, the electromagnet 25A becomes energized so as to attract the armature 26 in opposition to the spring 27 to the position indicated in FIG. 7 where the coil spring 7 is now free to contract upon and grip the drum 2B, so as to maintain the latter at a predetermined angular position with the shaft 5.

Referring to FIGS. 8 and 9, the memory drum 15 is shown with the spring 18 coiled about the memory drum and coacting with the electromagnet 25B. When the electromagnet 25B is deenergized, as indicated in FIG. 8, the spring 18 loosely surrounds the memory drum 15, and an end 18B of the spring 18 engages an inner projection 29 of the casing 1. The other end 18A of the spring 18, which is turned away from the coils of the spring in a direction opposite to the end 18B, is attached to a push rod 28 which is in turn pivotally connected to armature 26 which is pivotally connected at 26A to the casing 1. Thus, at 26A the armature 26 is mounted on the casing 1 and acts as a one-armed lever.

Upon actuating a manually operable switch at the dash of the vehicle, the electromagnet 25B will be energized, so that as a result the armature 26 will be raised to the position shown in FIG. 9, thus raising the push rod 28 and acting on the end 18A of the spring 18 to cause the latter to tightly grip the memory drum 15.

In FIGS. 10 to 12 is shown an embodiment of the invention using a cover plate 31 disposed on top of the accelerator pedal on top in front and on both its sides.

The cover plate 31 may be attached to the accelerator pedal 30 by a pin 34 and may be moved either slidably in relation to the pedal or pivotally about said pin. An electrical switch having contacts 32 and 33 is in closed or open position depending on the relative position of the cover plate and the accelerator pedal.

Figure 13:
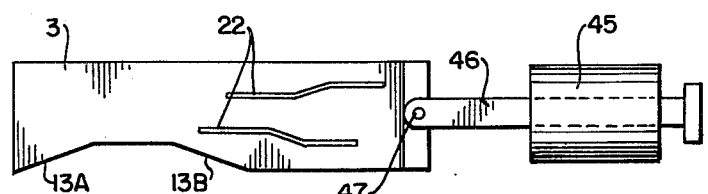
FIG. 13 is a plan view of the control slide operated by a solenoid.

In FIG. 13 is seen the embodiment in which a solenoid 45 is attached to control slide 3 by means of a core 46 and a pivot 47 for operation of the control slide.

What is claimed is:

1. In a device for releasably maintaining an accelerator pedal of a motor vehicle at a selected position, a rotary shaft having angular positions respectively corresponding to positions of the accelerator pedal, a stationary drum coaxially surrounding said rotary shaft and forming a bearing therefor, a rotary drum coaxially with and located adjacent said stationary drum, said rotary drum being fixed to said rotary shaft for rotation therewith, an elongated gripping spring surrounding said drums, said spring having convolutions which normally grip said drums to fix said rotary drum and shaft at a selected angular position with respect to said stationary drum, and said spring having a free end projecting away from said rotary drum, a stationary sleeve surrounding said stationary drum and located closely adjacent to said spring for maintaining the latter on said stationary drum, a loose sleeve surrunding said rotary drum and spring thereon, said loose sleeve having an inner diameter slightly greater than said spring so as to loosely surround the latter, and said free end of spring being connected with said loose sleeve so as to provide a predetermined angular position of said loose sleeve with respect to said rotary drum when said spring grips the latter, an operating projection fixed to and projecting from said loose sleeve, movable means having an initial unlocking position of rest, engaging said operating projection to maintain said loose sleeve at an angular position where the convolutions of said spring are lifted away from said rotary drum, so that in the rest position of said movable means said rotary drum and shaft are freely turnable, and said movable means being movable from said unlocking rest position to an operating position releasing said operating projection so that said spring will then turn said loose sleeve to said predetermined angular position with respect to said rotary drum while gripping said rotary drum to maintain the latter and said shaft at a selected angular position, and moving means coacting with said movable means for moving the latter to one of said positions thereof.

2. The combination of claim 1 and wherein said moving means includes a return spring coacting with said movable means for normally maintaining the latter in said unlocking rest position.

3. The combination of claim 2 and wherein said moving means includes a Bowden cable operatively connected with said movable means for moving the latter from said rest position thereof in opposition to said return spring to said operating position where said operating projection is released.

4. The combnation of claim 2 and wherein said moving means includes a solenoid operatively connected to said movable means for shifting the latter in opposition to said return spring to said operating position.

5. The combination of claim 1 and wherein said loose sleeve has a diameter which is on the order 0.1 mm. greater than the diameter of said spring.

6. The combination of claim 1 and wherein said movable means is movable in a given direction from said rest position to said operating position thereof, and said movable means being movable in said given direction beyond said operating position to a further unlocking position where said moving means also coacts with said gripping spring for lifting the latter away from said rotary drum.

7. The combination of claim 6 and wherein said movable means also coacts with said operating projection to turn the latter and said loose sleeve therewith for lifting said spring away from said rotary drum when said movable means is displaced to said further unlocking position thereof.

8. The combination of claim 6 and wherein a third drum loosely surrounds said shaft and has an end face directed towards said loose sleeve and formed with a plurality of recesses distributed around said shaft, means coacting with said third drum to prevent axially movement thereof with respect to said shaft, a flange fixed to and projecting radially from said shaft between said loose sleeve and said third drum, said flange being formed with bores passing therethrough and distributed about said shaft, a plurality of ball members respectively located in said bores of said flange and extending normally partly into said recesses of said third drum, said stationary sleeve and loose sleeve respectively having overlapping toothed ends coacting with each other for turning said loose sleeve in a direction lifting said gripping spring from said rotary drum when said loose sleeve is axially advanced towards said stationary sleeve, a holding spring surrounding said third drum and having free ends extending into the region of said movable means, said movable means being formed with camming slots receiving said free ends of said holding spring for urging them toward each other to grip and hold said third drum against rotation so that when said rotary shaft is then turned said ball members will be displaced out of said recesses to advance said loose sleeve toward said stationary sleeve so that the teeth of said loose sleeve will coact with said stationary sleeve to turn said loose sleeve for lifting said spring away from said rotary drum to unlock said rotary drum and shaft.

9. The combination of claim 6 and wherein a Bowden cable is operatively connected with an operating pedal of the vehicle for moving said movable means beyond said operating position thereof in said given direction to said further unlocking position.

10. The combination of claim 1 and wherein said moving means includes a solenoid operatively connected with said movable means for situating the latter in said operating position, a switch located in the circuit of said solenoid, and an operating pedal of the vehicle operatively connected with said switch for operating the latter to open the circuit of said solenoid and thus release said movable means for return to said rest position thereof.

11. The combination of claim 1 and wherein said moving means includes a solenoid operatively connected to said movable means for shifting the latter to said operating position thereof when said solenoid is energized, and switching actuating means carried by the accelerator pedal and located in the circuit of said solenoid for deenergizing the latter and releasing said movable means for return to said rest position thereof upon actuation of said switch means carried by said accelerator pedal.

12. The combination of claim 11 and wherein said switch-actuating means carried by said accelerator pedal is in the form of a plate supported on said accelerator pedal for free movement with respect thereto through a distance sufficient to open said circuit when said plate is moved with respect to said accelerator pedal before the latter is moved.

13. The combination of claim 12 and wherein said plate carried by said accelerator pedal is a cover plate covering the accelerator pedal and movable with relatively slight play with respect thereto for opening and closing a given circuit upon actuation of a switch by said cover plate.

References Cited

UNITED STATES PATENTS

| | | | |
|---|---|---|---|
| 2,554,619 | 5/1951 | Goik | 74—513 |
| 2,822,902 | 2/1958 | Glick | 74—513 XR |

FRED C. MATTERN, JR., Primary Examiner

F. D. SHOEMAKER, Assistant Examiner

U.S. Cl. X.R.

188—67, 77